United States Patent [19]

Korenowski

[11] Patent Number: 4,734,159
[45] Date of Patent: Mar. 29, 1988

[54] EVAPORATION APPARATUS

[75] Inventor: Theodore F. Korenowski, Branford, Conn.

[73] Assignee: TFK Company, Inc., Branford, Conn.

[21] Appl. No.: 851,732

[22] Filed: Apr. 14, 1986

Related U.S. Application Data

[63] Continuation of Ser. No. 757,530, Jul. 22, 1985, Pat. No. 4,600,474.

[51] Int. Cl.$^4$ ............................................. B01D 1/30
[52] U.S. Cl. ..................................... 159/16.1; 159/35; 159/44; 159/DIG. 32; 202/175; 202/181; 202/265; 203/1; 203/4; 203/DIG. 18
[58] Field of Search ................... 159/44, 35, DIG. 32, 159/16.1, 32, 38, 41, 40, 43.1; 203/49, DIG. 18, 1, DIG. 8, 22, 25, 4, 12, 100; 202/235, 265, 175, 181

[56] References Cited

U.S. PATENT DOCUMENTS

| | | | |
|---|---|---|---|
| 2,936,215 | 10/1960 | Hochmuth | 159/47.3 |
| 3,212,559 | 10/1965 | Williamson | 159/4.02 |
| 3,275,062 | 9/1966 | Williams | 159/4.02 |
| 3,443,623 | 5/1969 | Sinex | 159/44 |
| 3,480,513 | 11/1969 | Martin | 159/44 |
| 3,529,939 | 9/1970 | Mason | 159/44 |
| 3,725,205 | 4/1973 | Heen | 202/175 |
| 3,847,713 | 11/1974 | Akune et al. | 159/47.3 |
| 3,890,207 | 6/1975 | Chapman et al. | 203/DIG. 8 |
| 3,912,577 | 10/1975 | Akune et al. | 159/4.02 |
| 3,920,505 | 11/1975 | Helleur | 159/47.3 |
| 3,922,189 | 11/1975 | Penders | 159/4.02 |
| 4,131,507 | 12/1978 | Morales | 159/23 |
| 4,210,494 | 7/1980 | Rhodes | 203/49 |

FOREIGN PATENT DOCUMENTS 0024930 12/1956 Fed. Rep. of Germany ........ 203/49
3229030 2/1984 Fed. Rep. of Germany ...... 202/175

Primary Examiner—S. Leon Bashore
Assistant Examiner—V. Manoharan
Attorney, Agent, or Firm—DeLio & Associates

[57] ABSTRACT

Apparatus and method for using a heated waste gas stream to evaporate a volatile component such as water or a solvent from a liquid solution comprises a flue to feed the gas stream from the source of heated gas; a container having an inner chamber to hold the liquid for evaporation of the volatile compound and an outer chamber connected to the flue which forms a gas channel substantially surrounding the inner chamber through which at least a portion of the gas stream flows to supply heat to the inner chamber and evaporate the volatile component of the liquid solution; an inlet to feed the liquid solution into the inner chamber; upper and lower liquid level sensors to control the quantity of liquid solution fed into the inner chamber to establish a liquid level therein; a sparger for agitating the liquid solution in the inner chamber; a sump below the container and connected to the flue to receive any condensate from the gas stream and any liquid leaking from the inner chamber; an outlet to combine, vent and discharge the evaporated volatile component from the inner chamber and the gas stream from the outer chamber; and an outlet for removing the liquid from the inner chamber. The sump includes a dam to prevent the condensate and leaking liquid from flowing back through the flue to the source of the gas stream and a discharge outlet to allow draining when the received condensate and leaking liquid exceed a predetermined amount.

10 Claims, 1 Drawing Figure

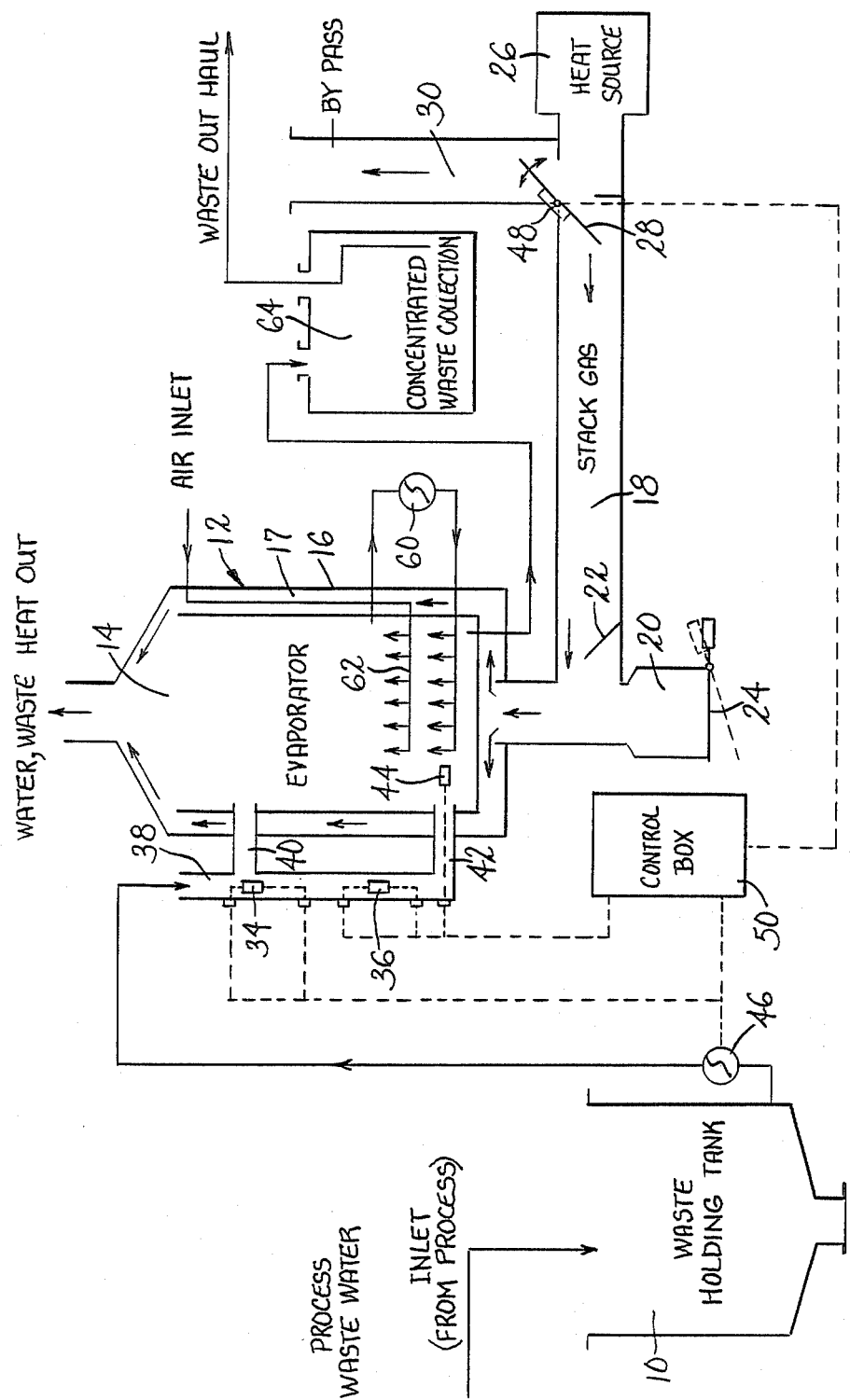

EVAPORATION APPARATUS

This is a continuation of co-pending U.S. patent application Ser. No. 757,530 filed July 22, 1985 now issued as U.S. Pat. No. 4,600,474.

BACKGROUND OF THE INVENTION

This invention relates to heat recovery and more particularly to a method and apparatus for recovering said heat from waste gas streams.

One current problem with many industrial processes is the safe and economical disposal of waste water and other waste fluid streams generated by the process. This problem is complicated by the fact that many of these streams are contaminated with one or more dissolved or suspended components which are present in amounts above those allowed by present day federal and/or state regulations. Where such contamination is present, the costs involved with either transporting large amounts of a relatively dilute solution to a treatment facility or of internally concentrating said solution so that the volume of material which must be handled is substantially reduced, are often a significant part of the total costs of the manufacturing process from which the waste fluid streams emanated. Further, many of these contaminants have a substantial economic value which, if they could be economically recovered, their recovery could be used to offset total costs.

Accordingly, what is needed is a low cost process which utilizes a source of energy either to evaporate volatile agents such as industrial solvents for recovery, or to concentrate the waste fluid streams so that conventional precipitation, filtration and/or other methods of treatment and disposal can be more efficiently conducted.

One such source of energy is the hot waste flue gas, exhaust air, and the like which are generated from industrial/commercial furnaces, ovens, incinerators, and similar devices and which often contain substantial quantities of heat energy. These gases are commonly discharged through convenient duct work (stacks) leading to the environment. While these "stack" gases may have temperatures as high as 1500° F. or more, this heat energy is frequently lost and abandoned due to the complexity, cost, and low efficiency of many present day methods for recovering and using their heat energy. Furthermore, many of these gas streams are themselves contaminated with large quantities of water vapor and carbon dioxide, as well as smaller amounts of carbon monoxide, unburned hydrocarbons, fly ash, acidic sulfur and nitrogen oxides, hydrogen chloride and other vaporous or solid entrained species, all of which act to render such streams obnoxious, corrosive or abrasive. As a result, direct use of such gas streams is generally avoided as a heat source even in potential applications where the above noted problems could be tolerated.

In part, this avoidance can be particularly attributed to the large amount of water vapor frequently present in these gases. If the stack gases are piped directly from their point of origin to some application for recovery and use of their heat energy, the resultant cooling could easily cause at least some of this vapor to condense, resulting in a significant quantity of liquid water flowing back to the source of the heat energy. Such an event could seriously damage furnaces, ovens, or other equipment used to generate the heat. Indeed, in situations where molten metals are involved, contact with even a small amount of liquid water could result in a serious explosion. Further, if the gas is used to heat a quantity of liquid, any leakage from the vessel containing such liquid could lead to the same undesirable result.

As a result, most conventional schemes to recover and utilize heat values from stack gases rely on the use of heat exchangers having a pressurized heat exchange fluid to transfer heat from the hot gases for use in another process. Since such a system often requires that the heat transfer fluid be circulated through a second heat exchanger located in contact with the process at the point where the heat energy is to be utilized it is inherently inefficient owing to the multiple heat transfers that are needed for the process to operate. Further, the aforementioned problems with free flowing condensate and/or system leakage are not really alleviated to any great degree and, in fact, may be aggravated since a second, pressurized heat transfer fluid is now involved.

In view of these considerations, the routine utilization of waste stack gas as a source of heat energy for industrial use is often ignored or dismissed as impractical. Consequently, industries that deal in the refining, casting, and working of metals such as steel, aluminum, zinc, copper, and the like, frequently discharge substantial quantities of waste heat energy in stack gases with little regard being given to waste heat recovery schemes even for the evaporative purification of waste water which has been contaminated by their basic processes.

Similarly, many large incinerators are operated for the purpose of reducing the volume of commercial and domestic wastes through combustion. Here, too, little regard is usually given to utilizing the heat generated by such operations for the evaporative purification of system cooling water or the drying of waste sludges either for easier transport and/or resource recovery.

Since the costs of treating waste water streams to meet EPA, RICRA and state requirements for the contaminants therein often have a significant impact on the competitiveness of many industrial processes, the advantages of either economically recovering the water or concentrating the waste for treatment are obvious. Further, in view of the number of such sources of waste heat, the magnitude of the annual thermal energy loss resulting by such discharge must be of truly staggering proportions. In addition, the aggregate heat content in such discharge, especially in urban areas, has the capacity to cause severe environmental perturbations. Clearly, advances in the techniques for stack gas heat recovery are required so that this energy resource can be viably applied for beneficial purposes.

OBJECTS OF THE INVENTION

It is an object of the present invention to provide a new and improved method and apparatus for the use of the waste heat energy in a gas stream for the evaporation and removal of volatile components from liquid solutions.

Another object of the present invention is to provide a new and improved method for using the waste heat energy in a gas stream to heat a liquid solution so as to cause the evaporation of a volatile component therefrom to prevent the liquid solution from flowing back to the source of the gas stream.

These and other objects of the present invention will become apparent from a consideration of the attached drawings, the following description and the appended claims.

SUMMARY OF THE INVENTION

The present invention relates to a novel method and apparatus which simplifies the recovery and utilization of heat energy in stack gases and the like. For the purposes of this application, the term "stack gas" is meant to include any waste gas stream from any industrial, commercial, or domestic operation that contains potentially useful heat energy that is normally discharged to the environment.

The novel method and apparatus disclosed herein form a system permitting the effective and efficient use of such heat energy to perform evaporative processes such as concentration and distillation; thereby combining in one operation the recovery and the use of the heat values therein. To do this, a fluid, having at least one volatile component dissolved or suspended therein, is introduced into a container which is placed in contact with and substantially surrounded by at least a portion of said stack gas en route, in a conduit, from its point of origin to a point from which it is discharged into the atmosphere. By so doing, the volatile component is heated and evaporated either for discharge with said gas or for the stripping and recovery of said volatile component in substantially pure form. The apparatus further comprises one or more devices to prevent any significant liquid flow back through the conduit to the source of said gas, control means to allow the apparatus to be operated in either a continuous or batch manner and container means to receive and store both dilute incoming fluid waste streams and outgoing stripped or discharged concentrated material.

DETAILED DESCRIPTION OF THE INVENTION

A schematic flow chart of one embodiment of the method of the present invention is shown in the Figure. As shown therein, streams of process waste water collected from various industrial process operations such as washing, quenching, dissolution, etc., are collected in waste holding tank 10 for storage. Such waste water streams are typically contaminated with some amounts of dissolved inorganic materials, organic materials, such as cutting oils and solvents, acids, and various suspended materials. In the discussion which follows such waste water is treated either to recover a volatile component therein or to increase the concentration on contaminants in the waste water for more economical treatment prior to disposal. Obviously, other uses such as recovering the evaporated water for reuse or generating low pressure process steam are also possible and are to be considered within the scope of the present invention.

The stored waste water is pumped into evaporator 12, which basically comprises an inner chamber 14 and an outer chamber 16 gas containing a channel 17 which substantially surrounds said inner chamber all of which fit into flue 18. Depending on the exact parameters of the process such an input may be either continuous or batch.

Associated with chamber 16 is sump 20, which receives and holds any water and/or agglomerated material which condenses out of the gas stream as it passes through gas channel 17. Sump 20 is itself structured to prevent any of said condensate from finding its way back down flue 18 to the source of the gas.

While materials of construction for evaporator 12, sump 20 and dam 22 are not critical, it should be recognized that many of the fluid waste streams, gases and condensates contain significant quantities of acidic materials which may be quite corrosive. Further, the fly ash and other solid contaminants in the stack gas can, at the temperatures and flow velocities involved, become quite abrasive and cause significant erosive damage to these components. Good design practice will take these matters into consideration.

Where there is a more serious problem, such as the sudden influx of a large quantity of solution resulting from a rupture of inner chamber 14, sump 20 is positioned to intercept such influx and is also equipped with emergency discharge means 24 to assure its quick removal from flue 18. Such means can be as small as a counterweighted trap door or check valve which is adapted to open only when a present weight of fluid has been accumulated in sump 20, with said means automatically closing when sump 20 is drained. Of course, more complex devices can be used should particular circumstances require them. Such devices are well known in the art.

In practice, hot stack gases are picked up close to their source of generation by heat collector box 26 with a butterfly deflector flap 28. In the present invention, this is controlled so as to allow at least a portion of the gas to be directed into flue 18 for transit through gas channel 17. Further, deflector 28 can be counterbalanced such that, in the event of a system failure, it will automatically close off flue 18 and thus completely bypass evaporator 12 by discharging said gas stream directly into the ambient environment through chimney 30. This bypass mode is an important feature to prevent overheating of the evaporator and any contents therein when, for example, the liquid has been completely evaporated. Additionally, some industrial furnaces require periodic additions of corrosive fluxing agents. Such heat bypass would normally be used during fluxing to prevent corrosion of the components of evaporator 12 by vaporizing flux.

In a preferred embodiment of the apparatus of this invention, evaporator 12 is arranged as a double chamber arrangement. The outer chamber 16 of the evaporator which forms gas channel 17 is essentially a cylinder set on a base plate (not shown). Firm mechanical attachment of the two chambers should be avoided to allow for normal thermal expansion and contraction as the apparatus is operated.

Inner chamber 14 receives the liquid solution to be evaporated while the outer chamber 16 receives the hot stack gas at its base and guides it around the side of inner chamber 14 to permit heat to be transferred to inner chamber 14 and the liquid solution contained therein. In an evaporation application, the stack gases and vapors from inner chamber 14 combine at the top of evaporator 12 and exit together through a continuation of flue 18. If the vapors are to be condensed as a purified liquid (distillation application) a separate exit (not shown) is provided so that vapors can be directed to an air or water cooled condenser unit (not shown). It is of interest to note that with a water evaporation unit, the combined mixture of water vapor and gases exiting the evaporator could also be passed through a condenser unit before being exhausted so that both the water of evaporation and the water vapor in the stack gas could be condensed and recovered. Further, the heat energy released by such condensation could be itself utilized for some other function such as space heating.

In either evaporation or distillation, it is preferred, but not necessary, that the level of liquid in the inner chamber can be controlled so that it does not either overflow due to excessive inflow rates or run dry due to over rapid evaporation. Once such a level is established, the rate of fluid input should be adjusted to a point where a boiling condition can be maintained with the available heat from stack gas alone without the need for an auxiliary heat source. In this manner, an optimum quantity of liquid is present in the inner tank to adsorb as much heat from the gases as possible or practical. This level is maintained by fluid level sensors 34 and 36 which are adjustably fitted into feed line 38 and monitor the fluid level through side arms 40 and 42.

These sensors are supplemented by a sensor such as float valve 44 which acts as a fail-safe monitor in the event lower level monitor 36 fails. These monitors along with fluid pump 46 and motor control 48 for deflector flap 28 are all integrated in systems control box 50. By so doing it is possible to operate in a more or less optimum manner where the flow rate of fluid into chamber 14 is just equal to the rate at which the volatile component thereof is being removed by evaporation. Control box 50 can also be set up to operate various alarms (not sown) should a malfunction occur and to provide various status signals to a supervisory system such as a host computer (not shown). Techniques for exercising such control are well known.

In the preferred embodiment, the liquid in inner chamber 14 is also agitated via a pump 60 which recirculates the liquid in a closed loop. The liquid can be still further agitated by air injection through a sparger 62 located at the botton inner chamber 14. Such injection has been found to greatly enhance the evaporation process (30-40% improvement in evaporation rate). While pressurized air from any source could be employed, air blowers are preferred as a low cost air source. Further, as shown in the Figure, the air can be preheated by placing the delivery pipe within gas channel 17. By so doing even further quantities of waste heat can be recovered.

The system of the present invention is completed when the concentrated residue of the aforementioned evaporation is drained from inner chamber 14 into waste collection box 64. Depending on the nature of the fluid being treated, this can be either continuous or, more usually, periodic depending either on when the quantity of stripped fluid reaches upper level control 34 or the concentration of contamination in the evaporated waste stream reaches some preset level.

This invention may be embodied in other specific forms without departing from the spirit or essential characteristics thereof. The present embodiments are therefore to be considered in all respects as illustrative and not restrictive, the scope of the invention being indicated by the appended claims rather than be the foregoing description, and all changes which come within the meaning and range of equivalency of the claims are therefore intended to be embraced therein.

I claim:

1. An apparatus for utilizing a heated gas stream to evaporate a volatile component from a liquid solution comprising:
    means for feeding the gas stream from a source of heated gas;
    container means having an inner chamber to hold the liquid solution for evaporation of said volatile component and an outer chamber connected to said gas feeding means forming a gas channel substantially surrounding said inner chamber through which the gas stream flows to supply heat to said inner chamber and evaporate the volatile component of said liquid solution;
    sump means below said container means and connected to said gas feeding means to receive any condensate from the gas stream and any liquid leaking from said inner chamber, so as to prevent the condensate and leaking liquid from flowing back through the gas stream feeding means to the source of the gas stream;
    means for feeding the liquid solution into said inner chamber; and
    means for combining and venting the evaporated volatile component from said inner chamber and said gas stream from said outer chamber for discharge.

2. The apparatus of claim 1 wherein said sump means further comprises dam means to prevent the liquid from flowing back to the source of the gas stream.

3. The apparatus of claim 1 wherein said sump means further contains discharge means to allow draining of said sump means.

4. The apparatus of claim 3 wherein said discharge means is a counterweighted trap door.

5. The apparatus of claim 1 further comprising upper and lower liquid level control means for controlling the quantity of the liquid solution which is fed into said inner chamber.

6. The apparatus of claim 1 further comprising means associated with said inner chamber for agitating said liquid.

7. The apparatus of claim 6 wherein said means for agitating said liquid comprises a sparger.

8. The apparatus of claim 1 further comprising means for draining liquid from said inner chamber.

9. An apparatus for utilizing a heated gas stream to evaporate a volatile component from a liquid solution comprising:
    means for feeding said gas stream from a source of heated gas;
    container means having an inner chamber to hold said liquid solution for evaporation of said volatile component and an outer chamber connected to said gas stream feeding means forming a gas channel substantially surrounding said inner chamber through which at least a portion of said gas stream flows to supply heat to said inner chamber and evaporate said volatile component of said liquid solution;
    means for feeding said liquid solution into said inner chamber;
    upper and lower liquid level control means for controlling the quantity of liquid solution fed into said inner chamber to establish a liquid level therein;
    means for agitating said liquid solution in said inner chamber;
    sump means below said container means and connected to said gas feeding means to receive any condensate from said gas stream and any liquid leaking from said inner chamber so as to prevent the condensate and leaking liquid from flowing back through the gas stream feeding means to the source of the gas stream, said sump means further having discharge means to allow draining thereof;

means for combining and venting the evaporated volatile component from inner chamber and said gas stream from said outer chamber for discharge; and means for removing said liquid solution from said inner chamber.

10. An apparatus for utilizing a heated gas stream to evaporate a volatile component from a liquid solution comprising:

means for feeding said gas stream from a source of heated gas;

container means having an inner chamber to hold said liquid solution for evaporation of said volatile component and an outer chamber connected to said gas stream feeding means forming a gas channel substantially surrounding said inner chamber through which at least a portion of said gas stream flows to supply heat to said inner chamber and evaporate said volatile component of said liquid solution:

means for feeding said liquid into said inner chamber;

upper and lower liquid level control means for controlling the quantity of liquid solution fed into said inner chamber to establish a liquid level therein;

sparger means for agitating said liquid solution in said inner chamber;

sump means below said container means and connected to said gas feeding means to receive any condensate from said gas stream and any liquid leaking from said inner chamber, said sump means including dam means to prevent the condensate and leaking liquid from flowing back through the gas stream feeding means to the source of the gas stream, said sump means further having discharge means to allow draining thereof when the received condensate and leaking liquid exceed a predetermined amount;

means for combining and venting the evaporated volatile component from said inner chamber and said gas stream from said outer chamber for discharge; and means for removing said liquid solution from said inner chamber.

* * * * *

UNITED STATES PATENT AND TRADEMARK OFFICE
CERTIFICATE OF CORRECTION

PATENT NO. : 4,734,159
DATED : Mar. 29, 1988
INVENTOR(S) : Theodore F. Korenowski It is certified that error appears in the above-identified patent and that said Letters Patent are hereby corrected as shown below:

In the Description:

Column 5, line 27, delete "sown" and substitute -- shown --.

In the Claims:

Column 7, line 2, insert -- said -- before "inner".

Signed and Sealed this

Ninth Day of August, 1988

Attest:

DONALD J. QUIGG

Attesting Officer

Commissioner of Patents and Trademarks